S. WALKER.
AUTOMOBILE WHEEL RIM.
APPLICATION FILED OCT. 2, 1917.

1,296,143.

Patented Mar. 4, 1919.

Inventor.
Saul Walker.
By
Fetherstonhaugh &Co.
attys.

UNITED STATES PATENT OFFICE.

SAUL WALKER, OF HAMILTON, ONTARIO, CANADA.

AUTOMOBILE-WHEEL RIM.

1,296,143.  Specification of Letters Patent.  Patented Mar. 4, 1919.

Application filed October 2, 1917. Serial No. 194,405.

*To all whom it may concern:*

Be it known that I, SAUL WALKER, of the city of Hamilton, in the county of Wentworth, in the Province of Ontario, Canada, have invented certain new and useful Improvements in Automobile-Wheel Rims, of which the following is the specification.

My invention relates to improvements in automobile wheel rims and the object of the invention is to devise a rim of this class, the parts of which may be easily and quickly disconnected one from the other without any appreciable exertion on the part of the operator so that the tire may be placed in position on or removed from the rim as desired and it consists essentially of the following arrangement and construction of parts as hereinafter more particularly explained.

In the drawings like characters of reference indicate corresponding parts in the various figures.

Figure 2:
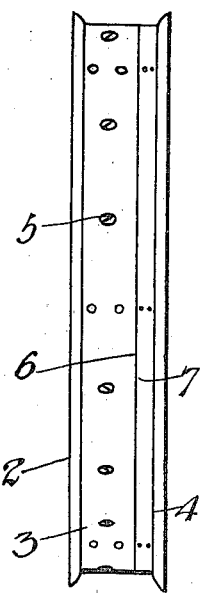
Fig. 2 is an edge elevation of the rim.
Figure 1:
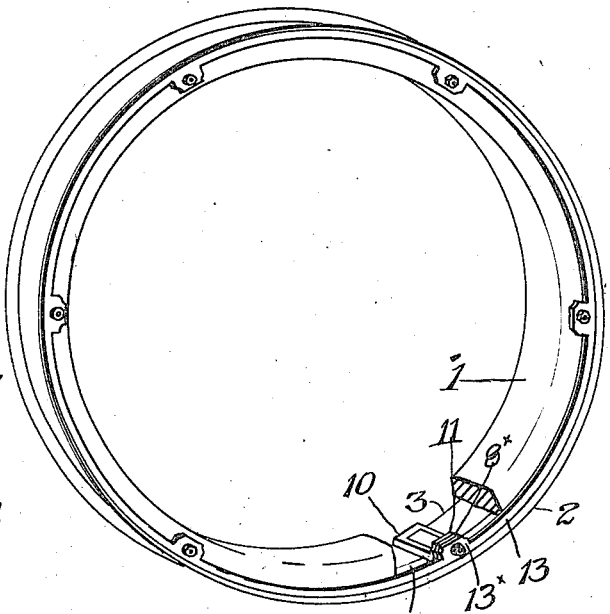
Figure 1 is a general perspective view of my rim showing it secured to a wooden felly, part of the felly being broken away to exhibit the construction of the rim.
Figure 5:
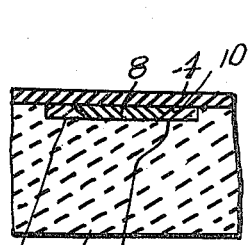
Fig. 5 is a cross sectional view on line $x$—$y$, Fig. 3.
Figure 3:
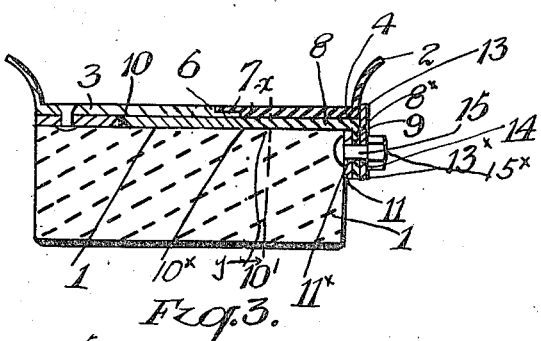
Fig. 3 is an enlarged cross sectional view taken through the detachable connection.
Figure 4:
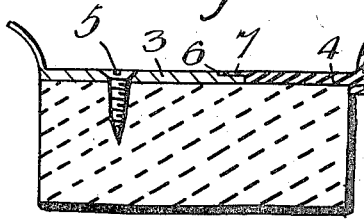
Fig. 4 is a similar view to Fig. 3 taken intermediately between two detachable connections.

1 indicates a wooden felly of any suitable form such as employed in automobile wheels, (it will of course be understood that an ordinary iron rim is on the wooden felly). 2 indicates the metal rim on which the automobile tire is carried. The rim 2 is divided into two parts 3 and 4, the portion 3 being permanently secured to the felly 1 by any suitable securing means such as screws 5. The inner edges of the parts overlap as at 6 and 7 thereby rendering the exterior face of the rim formed by the portions 3 and 4 flush one with the other.

8 indicates extended plates, having beveled edges, countersunk and welded to the interior face of the rim portion 4 at suitable distances apart and provided at their outer ends with lugs $8^x$ which extend inwardly from the plates at right angles thereto, such lugs being provided with orifices 9. 10 indicates plates countersunk and welded to the rim portion 3 in alinement with the plates 8, the portion $10^x$ of such plate 10 being provided with a recess $10^1$, having beveled edges into which the plate 8 fits. By this construction the parts are held rigidly together, and also by the plate 10 being provided at its outer end with a lug 11 extending inwardly against the inner face of the lug $8^x$. The lug 11 is provided with an orifice $11^x$ in alinement with the orifice 9.

13 indicates a ring provided with inwardly extending lugs $13^x$ provided with orifices 14 which are in alinement with the orifices 9 and $11^x$ when the lugs $13^x$ are in position.

15 indicate bolts extending through the orifices $11^x$, 9 and 14 whereby the lugs 11, $8^x$ and $13^x$ are secured rigidly together. The ring 13 is a flat metal ring and is designed to overlap the joint between the detachable rim portion 4 and the felly so as to prevent dust or dirt entering in between such rim portion and the felly.

When it is desired to remove a tire or place a tire in position upon the rim all that it is necessary to do is to remove the nuts $15^x$ of the bolts 15, remove the ring 13 and the rim portion 4. The tire may then be placed in position upon the rim or removed therefrom as desired, and the rim portion 4 slipped back into place, the ring 13 being then placed in position and the bolts 15 inserted through the alined orifices of the lugs 11, $8^x$ and $13^x$, the nuts $15^x$ being then screwed upon the bolts 15 securing the parts together.

From this description it will be seen that I have devised a very simple form of rim, the parts of which may be easily and quickly disconnected so that a tire may be either placed in position or removed by a lady or even a child if necessary as it practically requires no exertion on the part of the operator to make the desired change.

What I claim as my invention is:

A rim divided into two portions, a permanent portion and a removable portion both parallel to each other and with the face of the rim, the permanent portion being secured around the felly and having plates formed thereon countersunk into the rim extending laterally opposite to the side of the felly and each provided with an upturned end forming a side lug, the plate being recessed through the lug and toward its opposite end to provide a pocket, and the removable portion overlapping the permanent